US011124369B2

(12) United States Patent
Zhou et al.

(10) Patent No.: US 11,124,369 B2
(45) Date of Patent: Sep. 21, 2021

(54) PACKAGE RECEIVING AND SORTING APPARATUS AND PACKAGE RECEIVING AND SORTING METHOD

(71) Applicant: RAKUTEN GROUP, INC., Tokyo (JP)

(72) Inventors: Qingnan Zhou, Tokyo (JP); Toshiaki Tazume, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 16/652,408

(22) PCT Filed: Mar. 26, 2019

(86) PCT No.: PCT/JP2019/012968
§ 371 (c)(1),
(2) Date: Mar. 30, 2020

(87) PCT Pub. No.: WO2020/194532
PCT Pub. Date: Jan. 10, 2020

(65) Prior Publication Data
US 2021/0214170 A1    Jul. 15, 2021

(51) Int. Cl.
B65G 65/08    (2006.01)
B65G 65/10    (2006.01)
B65G 1/04    (2006.01)
B65G 47/82    (2006.01)
B65G 65/00    (2006.01)

(52) U.S. Cl.
CPC .......... B65G 47/82 (2013.01); B65G 1/0485 (2013.01); B65G 65/00 (2013.01); B65G 2201/0285 (2013.01)

(58) Field of Classification Search
CPC .......... B65G 1/04; B65G 47/82; B65G 65/08; B65G 65/10
USPC ............................... 198/370.02, 370.08, 429
See application file for complete search history.

(56) References Cited

U.S. PATENT DOCUMENTS

| 8,678,175 | B2 * | 3/2014 | Heim ..................... B65G 47/82 198/602 |
| 9,615,494 | B2 * | 4/2017 | Nagaya .................. H05K 13/04 |
| 9,811,796 | B2 * | 11/2017 | Ogilvie ................... B60L 53/51 |
| 10,138,074 | B2 * | 11/2018 | Anders ................ B65G 47/261 |
| 10,336,553 | B2 * | 7/2019 | Unterseher ............ B65G 47/26 |
| 10,689,111 | B2 * | 6/2020 | von Gostomski ....... B64D 1/10 |
| 10,941,000 | B2 * | 3/2021 | Wagner ................ B65G 47/905 |

(Continued)

FOREIGN PATENT DOCUMENTS

| CN | 104938441 A | 9/2015 |
| JP | 2017517466 A | 6/2017 |
| JP | 6201092 B1 | 9/2017 |

*Primary Examiner* — Douglas A Hess
(74) *Attorney, Agent, or Firm* — HEA Law PLLC

(57) ABSTRACT

When a first holder and a second holder are positioned at a pair of midway positions, a belt is arranged between the first holder and the second holder breadthways across a work area, and a package is positioned between the belt and a selected one delivery section. The first holder and the second holder come closer to each other when approaching a pair of final positions from the pair of midway positions. The belt is retracted by a retractor into the first holder and the second holder to pull the package in the direction of the selected one delivery section.

19 Claims, 6 Drawing Sheets

(56) References Cited

U.S. PATENT DOCUMENTS

| | | | |
|---|---|---|---|
| 11,009,886 B2* | 5/2021 | Sibley | B25J 5/007 |
| 2017/0013813 A1 | 1/2017 | Ma et al. | |
| 2017/0039510 A1 | 2/2017 | Ogilvie et al. | |
| 2017/0178071 A1 | 6/2017 | Ogilvie et al. | |
| 2019/0343317 A1* | 11/2019 | Cantrell et al. | |
| 2020/0226539 A1* | 7/2020 | Durkee | |
| 2020/0339350 A1* | 10/2020 | Dooley et al. | |

* cited by examiner

PACKAGE RECEIVING AND SORTING APPARATUS AND PACKAGE RECEIVING AND SORTING METHOD

CROSS REFERENCE TO RELATED APPLICATIONS

This application is a National Stage of International Application No. PCT/JP2019/012968 filed on Mar. 26, 2019. The contents of the above document is incorporated herein by reference in its entirety.

TECHNICAL FIELD

The present invention relates to a package receiving and sorting apparatus and a package receiving and sorting method.

BACKGROUND ART

In recent years, facilities referred to as, for example, "delivery box" or "delivery locker", which enable a receiving person to receive a package even when the receiving person is absent, have been spreading. In addition to being installed in apartment buildings, delivery boxes are also installed in public spaces, for example, railway stations, and may be used by many unspecified number of users. Recently, unmanned delivery using a drone (unmanned aerial vehicle) has been studied (Patent Literature 1 and Patent Literature 2).

CITATION LIST

Patent Literature

[PTL 1] JP 6201092 B1
[PTL 2] JP 2017-517466 A

SUMMARY OF INVENTION

Technical Problem

The related art may be inefficient, or require a complex mechanism, for receiving a plurality of packages by a plurality of drones and holding a plurality of packages for a plurality of receiving people.

It is an object of the present invention to enable a plurality of packages to be received and sorted by a simple mechanism.

Solution to Problem (1) According to one embodiment of the present invention, there is provided a package receiving and sorting apparatus including: a stage including a work area for receiving and sorting a package; a belt configured to push the package by moving breadthways across the work area; a first holder and a second holder, which are movable such that an interval between the first holder and the second holder is variable, and between which the belt is to be arranged; a movement path configured to guide movement of the first holder and the second holder along a peripheral edge of the work area; an actuator configured to cause the first holder and the second holder to move; and a retractor configured to retract the belt into the first holder and the second holder, wherein the peripheral edge of the work area includes a plurality of feeding sections for feeding the package to an outside of the work area, wherein the movement path includes: a plurality of delivery sections each adjacent to one of the plurality of feeding sections; a pair of final positions, at which the first holder and the second holder are positioned, respectively, when feeding of the package is complete; and a pair of midway positions, at which the first holder and the second holder are positioned, respectively, in a middle of feeding of the package, wherein the pair of final positions are arranged at both sides of a selected one of the plurality of delivery sections along the movement path, wherein the pair of midway positions are further away from each other than the pair of final positions along the movement path, wherein, when the first holder and the second holder are positioned at the pair of midway positions, the belt is arranged between the first holder and the second holder to cross the work area, and the package is positioned between the belt and the selected one of the plurality of delivery sections, wherein the first holder and the second holder are configured to come closer to each other when approaching the pair of final positions from the pair of midway positions, and wherein the belt is configured to pull the package in a direction of the selected one of the plurality of delivery sections by being retracted into the first holder and the second holder by the retractor.

According to the present invention, a plurality of packages can be received and sorted by a simple mechanism that uses a belt.

(2) In the package receiving and sorting apparatus according to Item (1), the pair of midway positions may be positioned at, of a plurality of positions on the movement path, two positions furthest away from each other in a straight line across the work area.

(3) In the package receiving and sorting apparatus according to Item (1) or (2), the actuator may be configured to cause the first holder and the second holder to move from the pair of midway positions to the pair of final positions such that the first holder and the second holder avoid passing through the selected one of the plurality of delivery sections.

(4) In the package receiving and sorting apparatus according to any one of Items (1) to (3), the pair of final positions may be adjacent to the selected one of the plurality of delivery sections along the movement path.

(5) In the package receiving and sorting apparatus according to any one of Items (1) to (4), the pair of final positions may be positioned along the movement path such that the selected one of the plurality of delivery sections is arranged between the pair of final positions and none of the plurality of delivery sections other than the selected one of the plurality of delivery sections is arranged between the pair of final positions.

(6) In the package receiving and sorting apparatus according to any one of Items (1) to (5), the movement path may include a pair of start positions, at which the first holder and the second holder are positioned, respectively, when sorting of the package starts, the pair of start positions may be closer to each other than the pair of midway positions along the movement path, and the pair of start positions may be different from the pair of final positions.

(7) In the package receiving and sorting apparatus according to Item (6), the movement path may include a pair of initial positions, at which the first holder and the second holder are positioned, respectively, before sorting of the package starts, and the actuator may be configured to cause the first holder and the second holder to move from the pair of initial positions to the pair of start positions when the pair of initial positions match the pair of final positions.

(8) In the package receiving and sorting apparatus according to Item (7), the movement path may include an initial section connecting the pair of initial positions in a close direction along the movement path, and the actuator may be configured to cause the first holder and the second holder to move from the pair of initial positions to the pair of start positions when the initial section overlaps the selected one of the plurality of delivery sections.

(9) In the package receiving and sorting apparatus according to Item (8), a direction in which the first holder and the second holder move from the pair of initial positions to the pair of start positions may be the same direction along the movement path.

(10) In the package receiving and sorting apparatus according to any one of Items (1) to (9), the package receiving and sorting apparatus further includes a storage repository, which is adjacent to the stage, and includes a plurality of storage spaces each corresponding to one of the plurality of feeding sections.

(11) According to one embodiment of the present invention, there is provided a method of receiving and sorting a package, the method including the steps of: unloading a package onto a stage including a work area; pushing the package by causing a belt arranged between a first holder and a second holder to move breadthways across the work area; and feeding, by the belt, the package to outside from one of a plurality of feeding sections at a peripheral edge of the work area, wherein the first holder and the second holder are guided by a movement path along the peripheral edge of the work area and are movable along the movement path, wherein the belt is configured to move by causing the first holder and the second holder to move, wherein the movement path includes: a plurality of delivery sections each adjacent to one of the plurality of feeding sections; a pair of final positions, at which the first holder and the second holder are positioned, respectively, when feeding of the package is complete; and a pair of midway positions, at which the first holder and the second holder are positioned, respectively, in a middle of feeding of the package, wherein the pair of final positions are arranged at both sides of a selected one of the plurality of delivery sections along the movement path, wherein the pair of midway positions are further away from each other than the pair of final positions along the movement path, wherein, when the first holder and the second holder are positioned at the pair of midway positions, the belt is arranged between the first holder and the second holder to cross the work area, and the package is positioned between the belt and the selected one of the plurality of delivery sections, wherein the first holder and the second holder are configured to come closer to each other when approaching the pair of final positions from the pair of midway positions, and wherein the belt is configured to pull the package in a direction of the selected one of the plurality of delivery sections by being retracted into the first holder and the second holder.

According to the present invention, a plurality of packages can be received and sorted by a simple mechanism that uses a belt.

(12) In the method of receiving and sorting a package according to Item (11), the pair of midway positions may be positioned at, of a plurality of positions on the movement path, two positions furthest away from each other in a straight line across the work area.

(13) In the method of receiving and sorting a package according to Item (11) or (12), the method may further includes a step of causing the first holder and the second holder to move from the pair of midway positions to the pair of final positions such that the first holder and the second holder avoid passing through the selected one of the plurality of delivery sections.

(14) In the method of receiving and sorting a package according to any one of Items (11) to (13), the pair of final positions may be adjacent to the selected one of the plurality of delivery sections along the movement path.

(15) In the method of receiving and sorting a package according to any one of Items (11) to (14), the pair of final positions may be positioned along the movement path such that the selected one of the plurality of delivery sections is arranged between the pair of final positions and none of the plurality of delivery sections other than the selected one of the plurality of delivery sections is arranged between the pair of final positions.

(16) In the method of receiving and sorting a package according to any one of Items (11) to (15), the movement path may include a pair of start positions, at which the first holder and the second holder are positioned, respectively, when sorting of the package starts, the pair of start positions may be closer to each other than the pair of midway positions along the movement path, and the pair of start positions may be different from the pair of final positions.

(17) In the method of receiving and sorting a package according to Item (16), the movement path may include a pair of initial positions, at which the first holder and the second holder are positioned, respectively, before sorting of the package starts, and the method may further include a step of causing the first holder and the second holder to move from the pair of initial positions to the pair of start positions when the pair of initial positions match the pair of final positions.

(18) In the method of receiving and sorting a package according to Item (17), the movement path may include an initial section connecting the pair of initial positions in a close direction along the movement path, and the method may further include a step of causing the first holder and the second holder to move from the pair of initial positions to the pair of start positions when the initial section overlaps the selected one of the plurality of delivery sections.

(19) In the method of receiving and sorting a package according to Item (18), a direction in which the first holder and the second holder move from the pair of initial positions to the pair of start positions may be the same direction along the movement path.

DESCRIPTION OF EMBODIMENTS

Now, an embodiment of the present invention is described with reference to the drawings. The present invention can be implemented by various modes without departing from the gist of the present invention, and is not to be construed as being limited to the descriptions of the exemplary embodiment described below.

Figure 1:
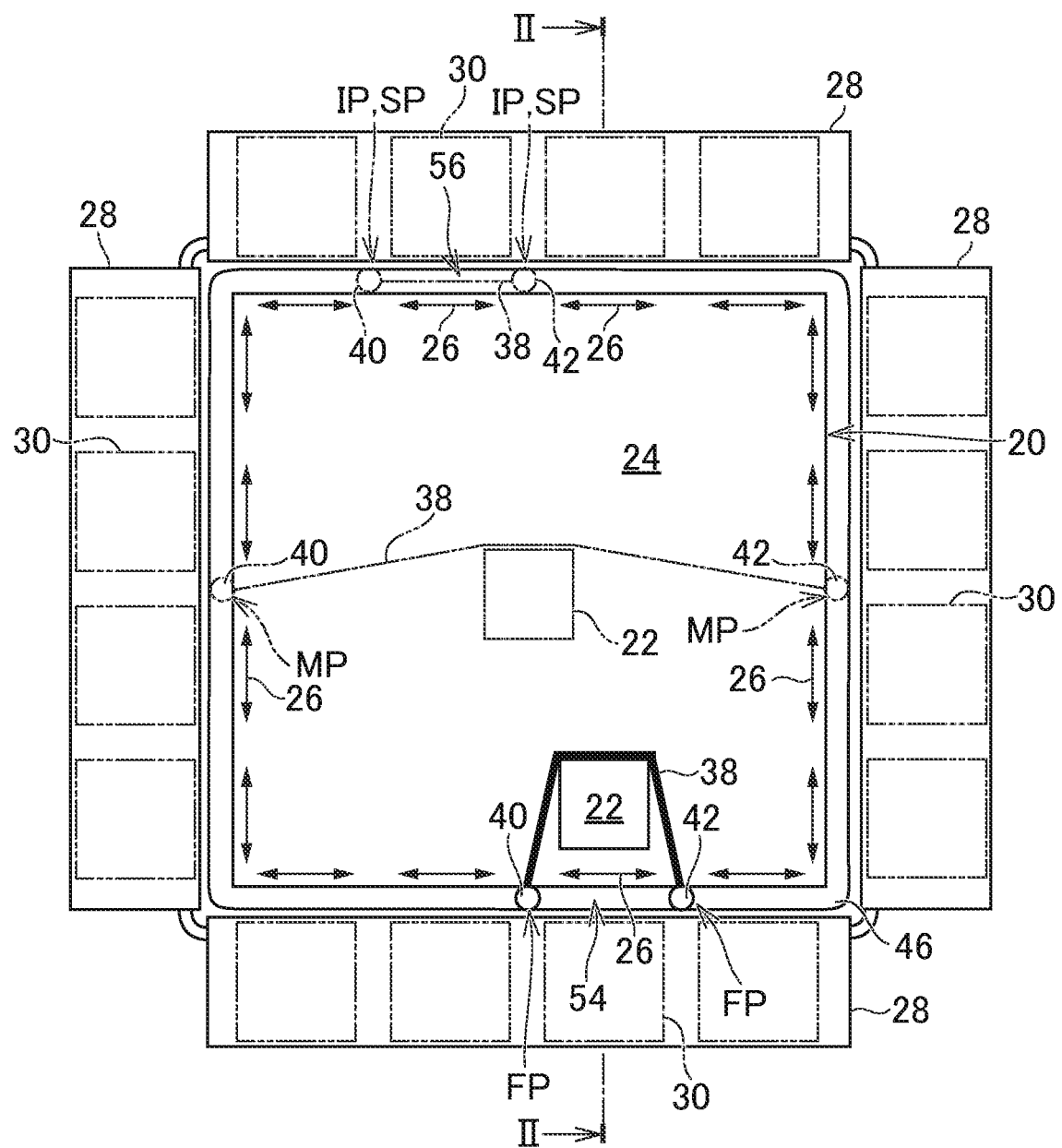
FIG. 1 is a plan view of a package receiving and sorting apparatus according to an embodiment of the present invention.
Figure 2:
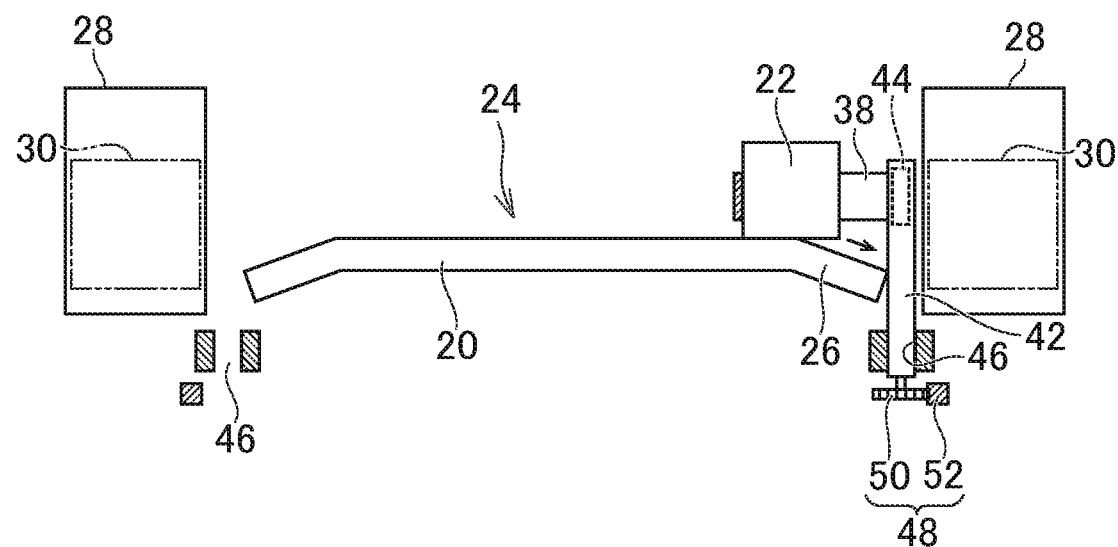
FIG. 2 is a cross-sectional view taken along the line II-II of the package receiving and sorting apparatus illustrated in FIG. 1.

FIG. 1 is a plan view of a package receiving and sorting apparatus according to the embodiment of the present invention. FIG. 2 is a cross-sectional view taken along the line II-II of the package receiving and sorting apparatus illustrated in FIG. 1. The package receiving and sorting apparatus includes a stage 20. The stage 20 includes a work area 24 for receiving and sorting a package 22. The work area 24 is used for unloading and slide movement of the package 22.

The package 22 is transported by an unmanned aerial vehicle (not shown), for example. The unmanned aerial vehicle is an aircraft on which a person does not board, and may be, for example, a drone configured to be driven by a battery or by an engine. The unmanned aerial vehicle includes a motor and a battery for rotating a propeller, and includes a control unit, a storage unit, a communication unit, and a sensor unit.

The package 22 may be unloaded from an unmanned aerial vehicle that has landed on the stage 20 or from an unmanned aerial vehicle that has not landed but is hovering above the stage 20. For example, the package 22 may be unloaded by suspending the package 22 from the unmanned aerial vehicle by a wire.

The peripheral edge of the work area 24 includes a plurality of feeding sections 26 for feeding the package 22 to the outside of the work area 24. As illustrated in FIG. 2, the plurality of feeding sections 26 are inclined in a downward manner in the external direction. As a result, the package 22 can be caused to slide in the external direction.

The package receiving and sorting apparatus includes a storage repository 28. The storage repository 28 is adjacent to the stage 20 (peripheral edge of work area 24). The storage repository 28 includes a plurality of storage spaces 30 each corresponding to one of the plurality of feeding sections 26.

The storage repository 28 is arranged at a periphery of the stage 20. The storage repository 28 may be arranged so as to surround the stage 20 in a continuous manner to prevent human intrusion. The storage repository 28 includes a wall as required. The storage repository 28 includes the plurality of storage spaces 30. Each of the plurality of storage spaces 30 is physically separated from an adjacent storage space. Each of the plurality of storage spaces 30 may include storage spaces 30 having different sizes. The plurality of storage spaces 30 are arranged in a horizontal direction, and may also be arranged in a vertical direction.

Figure 3:
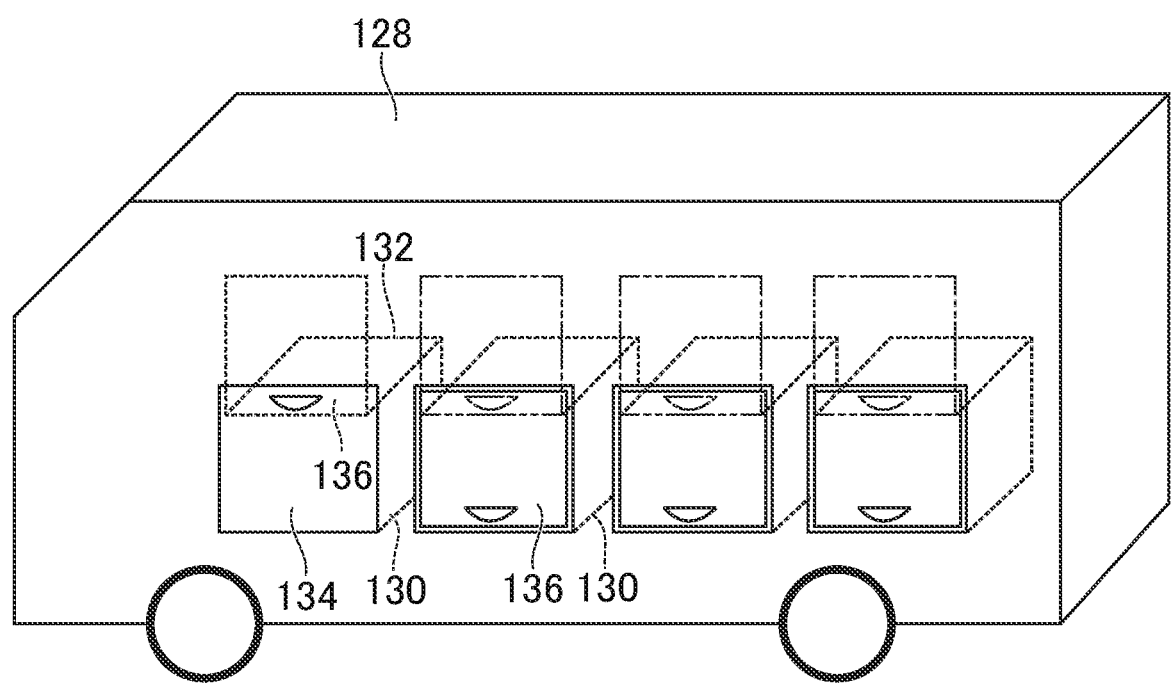
FIG. 3 is a diagram for illustrating a storage repository in a modification example of the present invention.

FIG. 3 is a diagram for illustrating a storage repository 128 in a modification example of the present invention. In the modification example, the storage repository 128 is movable, and is not fixed to the stage 20. For example, a delivery moving machine having a plurality of storage spaces 130 may include the storage repository 128, and may be adjacent to the stage 20 in order to store the package 22. The delivery moving machine may be an unmanned moving machine (robot) that can move without being manned, or may be a manned vehicle (delivery truck). Each storage space 130 includes a carry-in port 132 configured to be adjacent to the outer edge of the stage 20. Each storage space 130 includes a take-out port 134 on an opposite side to the carry-in port 132. The take-out port 134 includes a door 136 that is openable and closable. The take-out port 134 is lockable and unlockable. The take-out port 134 is controlled to be locked when the package 22 is stored.

As illustrated in FIG. 1 and FIG. 2, the package receiving and sorting apparatus includes a belt 38. Example of the belt 38 may include a V-belt, a flat belt, or a round belt, and the cross-sectional shape of the belt 38 is not limited to any shape. The belt 38 may be made of any one of fiber, resin, and metal, but is at least flexible enough so that the belt 38 can be bent. The belt 38 can push (or pull) the package 22 by moving breadthways across the work area 24.

The belt 38 is arranged between the first holder 40 and the second holder 42. The first holder 40 and the second holder 42 are each rotatable such that an opening (not shown) from which the belt 38 is to be drawn out can face or not face the first holder 40 and the second holder 42. The belt 38 is configured to be retracted into the first holder 40 and the second holder 42 by a retractor 44 illustrated in FIG. 2. The retracting is, for example, winding, and the retractor 44 may be a winding machine, for example, a winch.

The retractor 44 is built in at least one of the first holder 40 and the second holder 42. The retractor 44 may also be built in each of the first holder 40 and the second holder 42, and the belt 38 may be wound from each of the first holder 40 and the second holder 42 at an equal speed.

The first holder 40 and the second holder 42 are movable such that the interval therebetween varies. The movement of the first holder 40 and the second holder 42 is guided by a movement path 46. The movement path 46 runs along the peripheral edge of the work area 24. The first holder 40 and the second holder 42 are moved by an actuator 48. In the example illustrated in FIG. 2, the actuator 48 includes a pinion gear 50 fixed to a stepping motor (not shown) or a servo motor (not shown) built in each of the first holder 40 and the second holder 42, and a rack 52 arranged along the movement path 46. The first holder 40 and the second holder 42 are configured to move along the rack 52 (movement path 46) by the rotation of the pinion gear 50.

As illustrated in FIG. 1, when the belt 38 is retracted into the first holder 40 and the second holder 42, the package 22 can be pushed (pulled) in the direction of a selected one feeding section 26. In this embodiment, a plurality of packages 22 can be received and sorted by a simple mechanism that uses the belt 38.

Figure 4:
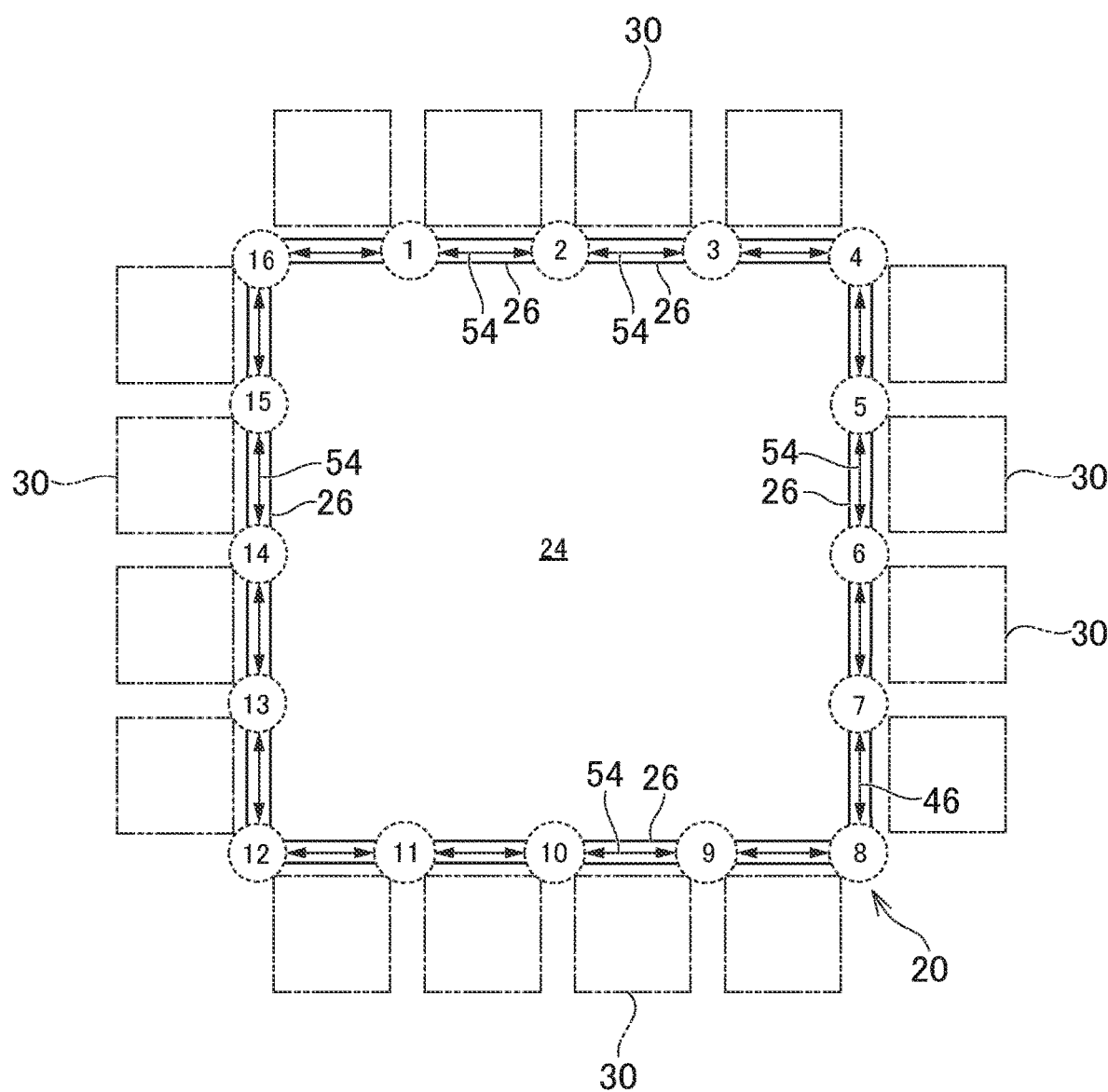
FIG. 4 is a diagram for illustrating details of a movement path.

FIG. 4 is a diagram for illustrating the details of the movement path 46. The movement path 46 includes a plurality of delivery sections 54 each adjacent to one of the plurality of feeding sections 26 (FIG. 1). The movement path 46 includes a plurality of positions 1 to 16, at each of which the first holder 40 and the second holder 42 can stop.

[Final Positions FP/Delivery Sections 54]

As illustrated in FIG. 1, the movement path 46 includes a pair of final positions FP, at which the first holder 40 and the second holder 42 are positioned, respectively, when feeding of the package 22 is complete. The pair of final positions FP are arranged at both sides of a selected one of the plurality of delivery sections 54 along the movement path 46. The pair of final positions FP are adjacent to the selected one delivery section 54 along the movement path 46. The pair of final positions FP are positioned along the movement path 46 such that the selected one delivery section 54 is arranged therebetween and none of the plurality of delivery sections 54 other than the selected one delivery section 54 is arranged therebetween.

[Midway Positions MP]

As illustrated in FIG. 1, the movement path 46 includes a pair of midway positions MP, at which the first holder 40 and the second holder 42 are positioned, respectively, in a middle of feeding of the package 22. The pair of midway positions MP are further away from each other than the pair of final positions along the movement path 46. The pair of midway positions MP are, of the plurality of positions 1 to 16 on the movement path 46 (FIG. 2), two positions furthest away from each other in a straight line across the work area 24 (e.g., positions 6 and 14).

[Start Positions SP]

The movement path 46 includes a pair of start positions SP, at which the first holder 40 and the second holder 42 are positioned, respectively, when sorting of the package 22 starts (FIG. 1). The pair of start positions SP are different from the pair of final positions FP. The pair of start positions SP are closer to each other than the pair of midway positions MP along the movement path 46.

[Initial Positions IP/Initial Section 56]

The movement path 46 includes a pair of initial positions IP, at which the first holder 40 and the second holder 42 are positioned, respectively, before sorting of the package starts. In the example of FIG. 1, the pair of initial positions IP match the pair of start positions SP. The movement path 46 includes an initial section 56 connecting the pair of initial positions IP in a close direction along the movement path 46.

Figure 5:
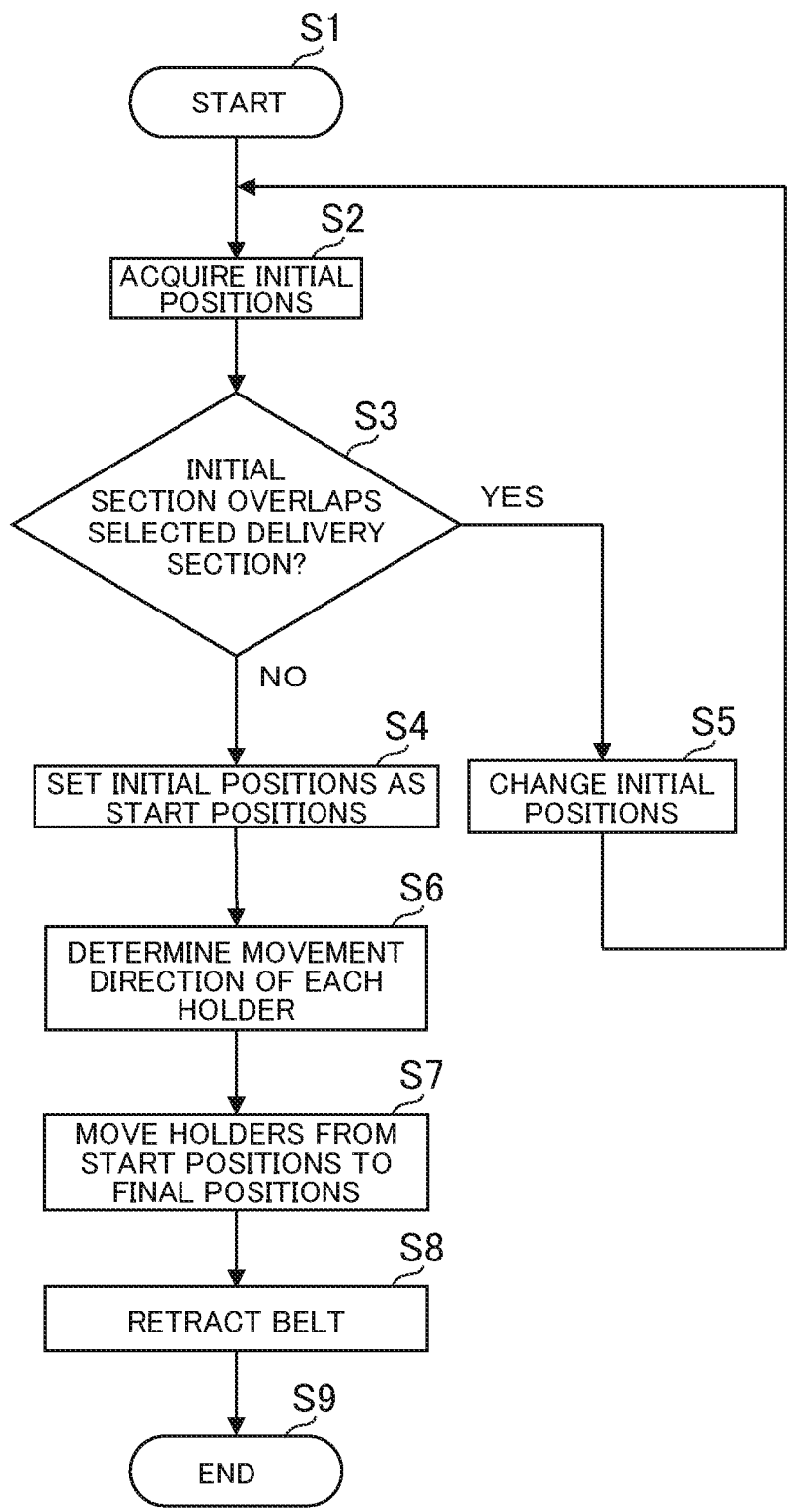
FIG. 5 is a flowchart for illustrating control of the package receiving and sorting apparatus or a package receiving and sorting method.

FIG. 5 is a flowchart for illustrating control of the package receiving and sorting apparatus or a package receiving and sorting method. Various types of control are performed by a control unit (not shown) included in the package receiving and sorting apparatus or a control apparatus (not shown) configured to control the package receiving and sorting apparatus.

When the unloading of the transported package 22 is finished, control of the package receiving and sorting apparatus is started (Step S1). When the control is started, the pair of initial positions IP are acquired (Step S2). In the case in which the actuator 48 includes a stepping motor (not shown) or a servomotor (not shown), the positions of the first holder 40 and the second holder 42 are already stored in a memory (not shown), but additional processing of detecting the pair of initial positions IP may also be added. The initial section 56 between the pair of initial positions IP is determined in association with the pair of initial positions IP. Positions 1 and 2 illustrated in FIG. 4 are the pair of initial positions IP illustrated in FIG. 1.

Information on which storage space 30 the package 22 is to be stored in is transmitted to the package receiving and sorting apparatus by communication, for example, and stored in a memory (not shown). That is, one of the plurality of delivery sections 54 has been selected. Thus, it is determined whether or not the initial section 56 overlaps the selected one delivery section 54 (Step S3). This determination may include determining whether or not the pair of initial positions IP match the pair of final positions FP.

Positions 9 and 10 illustrated in FIG. 4 are the pair of final positions FP illustrated in FIG. 1. In the example illustrated in FIG. 1, the pair of initial positions IP (positions 1 and 2 of FIG. 4) do not match the pair of final positions FP (positions 9 and 10 of FIG. 4). When the determination result is "NO" as in this case, it is not required to change the initial positions IP, and the initial positions IP are set as the start positions SP (Step S4). The pair of start positions SP are set so that the initial section 56 does not overlap the selected one delivery section 54.

As a modification example, when the determination result is "YES", the pair of initial positions IP are changed (Step S5). Specifically, control is performed such that the first holder 40 and the second holder 42 are each moved from the pair of initial positions IP to other positions. In this case, the movement direction of each of the first holder 40 and the second holder 42 is the same direction along the movement path 46. It is then similarly determined whether or not the changed pair of initial sections 56 overlap the selected one delivery section 54. This determination includes determination of whether or not the changed pair of initial positions IP match the pair of final positions FP. The initial positions IP are repeatedly changed until the determination result becomes "NO". In this way, control is performed such that the first holder 40 and the second holder 42 are moved from the pair of initial positions IP to the pair of start positions SP.

The movement direction of each of the first holder 40 and the second holder 42 is determined (Step S6). The first holder 40 and the second holder 42 move from the pair of start positions SP to the pair of final positions FP (Step S7). The movement direction of each of the first holder 40 and the second holder 42 is the direction in which the first holder 40 and the second holder 42 come closer to each other when approaching the pair of final positions FP from the pair of midway positions MP. The movement direction of each of the first holder 40 and the second holder 42 is a direction that does not pass through the selected one delivery section 54 when the first holder 40 and the second holder 42 is moving from the pair of midway positions MP to the pair of final positions FP.

Specifically, a difference between each of the pair of start positions SP and each of the pair of final positions FP is calculated, and a combination of positions at which the absolute value of those differences is the smallest is identified. In the example of FIG. 1, the pair of start positions SP are the positions 1 and 2 (FIG. 4), the pair of final positions FP are the positions 9 and 10 (FIG. 4), and hence a combination of the positions 2 and 9 is identified. Therefore, the movement direction of the second holder 42 is the direction from the position 2 to the position 9, and the movement direction of the first holder is the opposite direction to that direction. When the directions have been determined, control is performed to move each of the first holder 40 and the second holder 42 from the pair of start positions SP to the pair of final positions FP (Step S7).

The belt 38 arranged between the first holder 40 and the second holder 42 moves breadthways across the work area 24. When the first holder 40 and the second holder 42 are positioned at the pair of midway positions MP, the belt 38 is arranged between the first holder 40 and the second holder 42 and across the work area 24. When the first holder 40 and the second holder 42 are positioned at the pair of midway positions MP, the package 22 is positioned between the belt 38 and the selected one delivery section 54.

Figure 6:
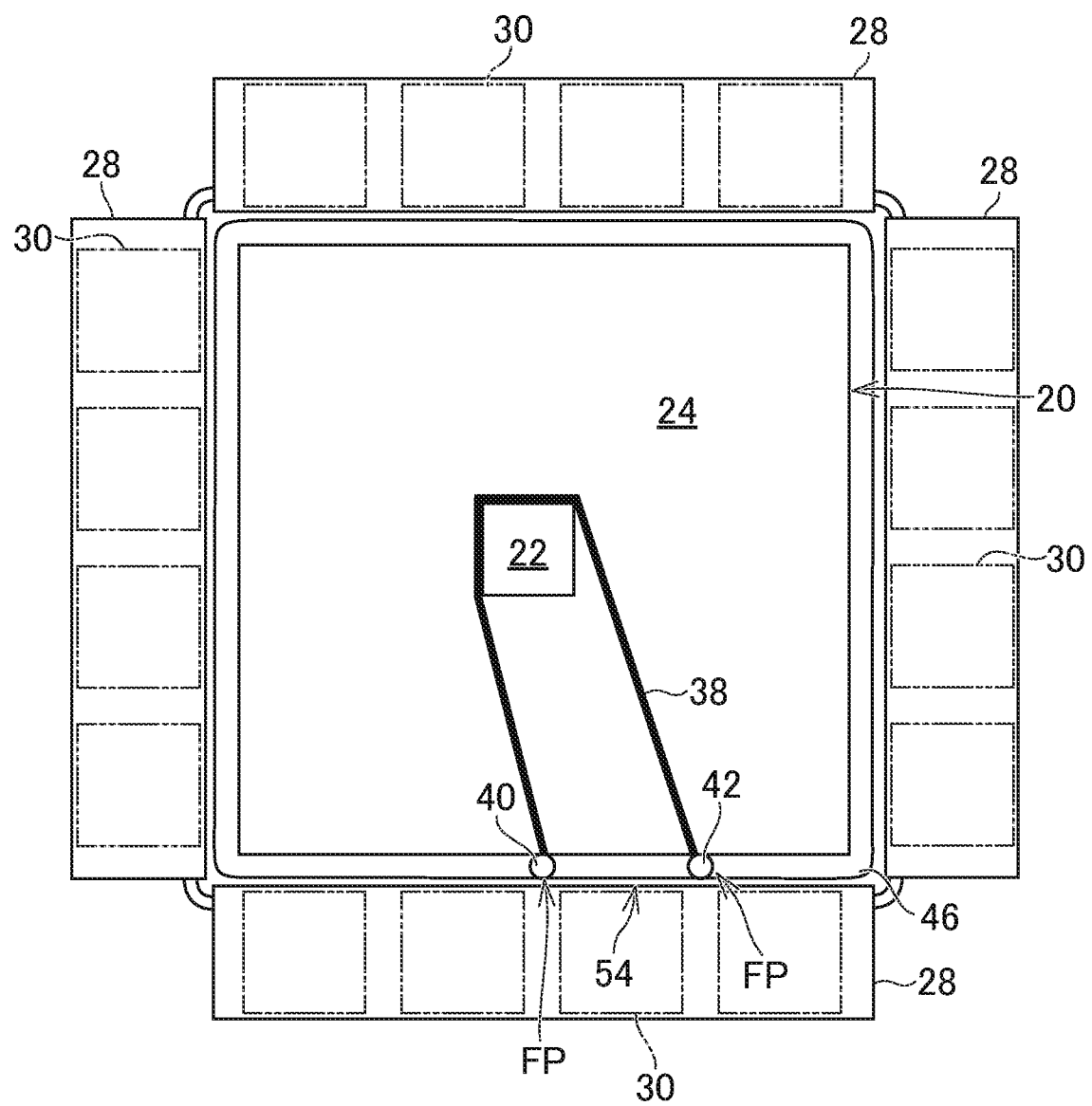
FIG. 6 is a diagram for illustrating a first holder and a second holder positioned at a pair of final positions.

FIG. 6 is a diagram for illustrating the first holder 40 and the second holder 42 at the pair of final positions FP. Until the first holder 40 and the second holder 42 reach the pair of final positions FP, the belt 38 is not yet retracted. The belt 38 is pulled out from the first holder 40 and the second holder 42 and hooks the package 22.

The retractor 44 retracts the belt 38 into the first holder 40 and the second holder 42 (Step S8). The package 22 is pulled in the direction of the selected one delivery section 54 (see FIG. 1). The belt 38 enables the package 22 to be fed out from one of the plurality of feeding sections 26 at the peripheral edge of the work area 24. The package 22 can then be stored in the storage space 30, and the control ends (Step S9).

The control described above is performed every time the package 22 is unloaded. More specifically, first control is started when a first package 22 is unloaded, and second control is started when a second package 22 is unloaded after the end of the first control. The initial positions (Step S2) acquired in the second control may be the final positions in the first control. As another example, after the first control is finished and before the second control is performed, control for resetting the initial positions (moving the first holder 40 and the second holder 42 to predetermined initial positions) may be performed.

The present invention is not limited to the embodiment described above, and various modifications may be made thereto. For example, the configuration described in the embodiment may be replaced by substantially the same configuration, a configuration having the same action and effect, and a configuration that may achieve the same object.

The invention claimed is:

1. A package receiving and sorting apparatus, comprising:
   a stage including a work area for receiving and sorting a package;
   a belt configured to push the package by moving breadthways across the work area;
   a first holder and a second holder, which are movable such that an interval between the first holder and the second holder is variable, and between which the belt is arranged;
   a movement path configured to guide movement of the first holder and the second holder along a peripheral edge of the work area;
   an actuator configured to cause the first holder and the second holder to move; and
   a retractor configured to retract the belt into the first holder and the second holder,
   wherein the peripheral edge of the work area includes a plurality of feeding sections for feeding the package to an area outside of the work area,
   wherein the movement path includes:
      a plurality of delivery sections, where each of the plurality of delivery sections is adjacent to one of the plurality of feeding sections;
      a pair of final positions, at which the first holder and the second holder are positioned, respectively, when feeding of the package is complete; and
      a pair of midway positions, at which the first holder and the second holder are positioned, respectively, in a middle of feeding of the package,
   wherein the pair of final positions are arranged at both sides of a selected one of the plurality of delivery sections along the movement path,
   wherein the pair of midway positions are located further away from each other than the pair of final positions along the movement path,
   wherein, when the first holder and the second holder are positioned at the pair of midway positions, the belt is arranged between the first holder and the second holder so as to cross the work area, and the package is positioned between the belt and the selected one of the plurality of delivery sections,
   wherein the first holder and the second holder are configured to come closer to each other when approaching the pair of final positions from the pair of midway positions, and
   wherein the belt is configured to pull the package in a direction of the selected one of the plurality of delivery sections by being retracted into the first holder and the second holder by the retractor.

2. The package receiving and sorting apparatus according to claim 1, wherein the pair of midway positions are positioned at, of a plurality of positions on the movement path, two positions located furthest away from each other in a straight line across the work area.

3. The package receiving and sorting apparatus according to claim 1, wherein the actuator is configured to cause the first holder and the second holder to move from the pair of midway positions to the pair of final positions, such that the first holder and the second holder avoid passing through the selected one of the plurality of delivery sections.

4. The package receiving and sorting apparatus according to claim 1, wherein the pair of final positions are adjacent to the selected one of the plurality of delivery sections along the movement path.

5. The package receiving and sorting apparatus according to claim 1, wherein the pair of final positions are positioned along the movement path such that the selected one of the plurality of delivery sections is arranged between the pair of final positions and none of the plurality of delivery sections other than the selected one of the plurality of delivery sections is arranged between the pair of final positions.

6. The package receiving and sorting apparatus according to claim 1,
   wherein the movement path includes a pair of start positions, at which the first holder and the second holder are positioned, respectively, when sorting of the package starts,
   wherein the pair of start positions are closer to each other than the pair of midway positions along the movement path, and
   wherein the pair of start positions are different from the pair of final positions.

7. The package receiving and sorting apparatus according to claim 6,
   wherein the movement path includes a pair of initial positions, at which the first holder and the second holder are positioned, respectively, before sorting of the package starts, and
   wherein the actuator is configured to cause the first holder and the second holder to move from the pair of initial positions to the pair of start positions when the pair of initial positions match the pair of final positions.

8. The package receiving and sorting apparatus according to claim 7,
   wherein the movement path includes an initial section connecting the pair of initial positions in a close direction along the movement path, and
   wherein the actuator is configured to cause the first holder and the second holder to move from the pair of initial positions to the pair of start positions when the initial section overlaps the selected one of the plurality of delivery sections.

9. The package receiving and sorting apparatus according to claim 8, wherein a direction in which the first holder and the second holder move from the pair of initial positions to the pair of start positions is the same direction along the movement path.

10. The package receiving and sorting apparatus according to claim 1, further comprising a storage repository, which is adjacent to the stage, and includes a plurality of storage spaces each corresponding to one of the plurality of feeding sections.

11. A method of receiving and sorting a package, the method comprising:
   unloading a package onto a stage including a work area;
   pushing the package by causing a belt arranged between a first holder and a second holder to move breadthways across the work area; and
   feeding, by the belt, the package to an outside area from one of a plurality of feeding sections at a peripheral edge of the work area, wherein the first holder and the second holder are guided by a movement path along the peripheral edge of the work area and are movable along the movement path, wherein the belt is configured to move by causing the first holder and the second holder to move, wherein the movement path includes:
- a plurality of delivery sections each adjacent to one of the plurality of feeding sections;
- a pair of final positions, at which the first holder and the second holder are positioned, respectively, when feeding of the package is complete; and
- a pair of midway positions, at which the first holder and the second holder are positioned, respectively, in a middle of feeding of the package, wherein the pair of final positions are arranged at both sides of a selected one of the plurality of delivery sections along the movement path, wherein the pair of midway positions are located further away from each other than the pair of final positions along the movement path, wherein, when the first holder and the second holder are positioned at the pair of midway positions, the belt is arranged between the first holder and the second holder so as to cross the work area, and the package is positioned between the belt and the selected one of the plurality of delivery sections, wherein the first holder and the second holder are configured to come closer to each other when approaching the pair of final positions from the pair of midway positions, and wherein the belt is configured to pull the package in a direction of the selected one of the plurality of delivery sections by being retracted into the first holder and the second holder.

12. The method of receiving and sorting a package according to claim 11, wherein the pair of midway positions are positioned at, of a plurality of positions on the movement path, two positions located furthest away from each other in a straight line across the work area.

13. The method of receiving and sorting a package according to claim 11, further comprising a step of causing the first holder and the second holder to move from the pair of midway positions to the pair of final positions such that the first holder and the second holder avoid passing through the selected one of the plurality of delivery sections.

14. The method of receiving and sorting a package according to claim 11, wherein the pair of final positions are adjacent to the selected one of the plurality of delivery sections along the movement path.

15. The method of receiving and sorting a package according to claim 11, wherein the pair of final positions are positioned along the movement path such that the selected one of the plurality of delivery sections is arranged between the pair of final positions and none of the plurality of delivery sections other than the selected one of the plurality of delivery sections is arranged between the pair of final positions.

16. The method of receiving and sorting a package according to claim 11,
wherein the movement path includes a pair of start positions, at which the first holder and the second holder are positioned, respectively, when sorting of the package starts,
wherein the pair of start positions are closer to each other than the pair of midway positions along the movement path, and
wherein the pair of start positions are different from the pair of final positions.

17. The method of receiving and sorting a package according to claim 16,
wherein the movement path includes a pair of initial positions, at which the first holder and the second holder are positioned, respectively, before sorting of the package starts, and
wherein the method further comprises a step of causing the first holder and the second holder to move from the pair of initial positions to the pair of start positions when the pair of initial positions match the pair of final positions.

18. The method of receiving and sorting a package according to claim 17,
wherein the movement path includes an initial section connecting the pair of initial positions in a close direction along the movement path, and
wherein the method further comprises a step of causing the first holder and the second holder to move from the pair of initial positions to the pair of start positions when the initial section overlaps the selected one of the plurality of delivery sections.

19. The method of receiving and sorting a package according to claim 18, wherein a direction in which the first holder and the second holder move from the pair of initial positions to the pair of start positions is the same direction along the movement path.

* * * * *